(12) United States Patent
Lerner et al.

(10) Patent No.: US 8,947,446 B2
(45) Date of Patent: *Feb. 3, 2015

(54) METHODS AND APPARATUS FOR IMAGE PROCESSING AT PIXEL RATE (71) Applicant: Analog Devices Technology, Hamilton (BM)

(72) Inventors: Boris Lerner, Sharon, MA (US); Michael Meyer-Pundsack, Egenburg, DE (US); Gopal Gudhur Karanam, Bangalore (IN); Pradip Thacker, Gujarat (IN)

(73) Assignee: Analog Devices Technology, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,531

(22) Filed: May 13, 2013

(65) Prior Publication Data
US 2013/0342551 A1 Dec. 26, 2013

Related U.S. Application Data (63) Continuation of application No. 12/619,825, filed on Nov. 17, 2009, now Pat. No. 8,130,229, and a continuation of application No. 13/354,819, filed on Jan. 20, 2012, now Pat. No. 8,441,492.

(51) Int. Cl.
G06F 13/372 (2006.01)
G06K 9/36 (2006.01)
(Continued)

(52) U.S. Cl.
CPC .................... *G06T 1/60* (2013.01)
USPC ........... 345/534; 345/530; 345/531; 345/545; 345/560; 345/615; 382/276; 382/278; 382/279

(58) Field of Classification Search
CPC ............. G06T 1/60; G06T 3/00; G06T 5/001; G06T 5/20; G06T 11/60; G09G 5/20; G09G 5/39; G09G 5/395; G09G 5/363; G06K 9/6203; G06F 17/153
USPC ......... 345/501, 502, 506, 530–531, 534, 454, 345/547, 558–561, 571, 615, 545; 382/276, 382/278–279, 302–303, 307–308; 711/167, 711/169
See application file for complete search history.

(56) References Cited

U.S. PATENT DOCUMENTS 4,918,742 A 4/1990 Simonds
4,947,446 A 8/1990 Jutand et al.
(Continued)

FOREIGN PATENT DOCUMENTS

GB 2180968 A 4/1987

OTHER PUBLICATIONS

Cope, "Reconfigurable Systems for Video Processing" http://cas.ee.ic.ac.uk/people/btc00/index_files/TransferReport.pdf, Dec. 2005, 90 pages.
(Continued)

*Primary Examiner* — Ke Xiao
*Assistant Examiner* — Jed-Justin Imperial
(74) *Attorney, Agent, or Firm* — Patent Capital Group (57) ABSTRACT

Embodiments of the present invention provide for improved timing control in 2-D image processing to maintain a constant rate of fetches and pixel outputs even when the processing operations transition to a new line or frame of pixels. A one-to-one relationship between incoming pixel rate and outgoing pixel rate is maintained without additional clock cycles or memory bandwidth as an improved timing control according to the present invention takes advantage of idle memory bandwidth by pre-fetching a new column of pixel data in a first pixel block of a next line or frame while a new column of an edge pixel block on a current line is duplicated or zeroed out. As the edge pixel block(s) on the current line are processed, the data in the first pixel block of the next line or frame become ready for computation without extra clock cycles or extra memory bandwidth.

29 Claims, 7 Drawing Sheets (51) Int. Cl.
*G06K 9/64* (2006.01)
*G06T 1/60* (2006.01)
*G09G 5/00* (2006.01)
*G09G 5/36* (2006.01)
*G09G 5/39* (2006.01)

(56) References Cited

U.S. PATENT DOCUMENTS

| | | | |
|---|---|---|---|
| 5,109,348 A | | 4/1992 | Pfeiffer et al. |
| 5,129,060 A | | 7/1992 | Pfeiffer et al. |
| 5,546,477 A | * | 8/1996 | Knowles et al. ............ 382/242 |
| 5,848,200 A | | 12/1998 | Butler et al. |
| 5,862,266 A | | 1/1999 | Hunter |
| 5,926,580 A | | 7/1999 | McCoy |
| 5,990,904 A | | 11/1999 | Griffin |
| 6,049,859 A | | 4/2000 | Gliese et al. |
| 6,208,772 B1 | | 3/2001 | Wilt et al. |
| 6,239,812 B1 | | 5/2001 | Pettazzi et al. |
| 6,377,713 B1 | | 4/2002 | Vuong |
| 6,408,107 B1 | | 6/2002 | Miller et al. |
| 6,515,672 B1 | * | 2/2003 | Sheaffer et al. ............ 345/534 |
| 6,643,412 B1 | | 11/2003 | Hong et al. |
| 6,690,727 B1 | | 2/2004 | Mehta |
| 6,704,026 B2 | | 3/2004 | Kurihara et al. |
| 6,771,272 B2 | | 8/2004 | Deering |
| 6,847,370 B2 | | 1/2005 | Baldwin et al. |
| 6,924,816 B2 | | 8/2005 | Deering |
| 6,928,196 B1 | | 8/2005 | Bradley et al. |
| 7,002,589 B2 | | 2/2006 | Deering |
| 7,079,157 B2 | | 7/2006 | Deering |
| 7,092,582 B2 | | 8/2006 | Hier et al. |
| 7,333,651 B1 | * | 2/2008 | Kim et al. ............ 382/154 |
| 7,379,613 B2 | | 5/2008 | Dowski, Jr. et al. |
| 7,452,048 B2 | | 11/2008 | Silverbrook |
| 7,492,490 B2 | | 2/2009 | Silverbrook |
| 7,505,068 B2 | | 3/2009 | Silverbrook |
| 7,583,082 B1 | | 9/2009 | Hu et al. |
| 8,766,992 B2 | | 7/2014 | Meyer-Pundsack et al. |
| 2002/0140685 A1 | * | 10/2002 | Yamamoto et al. ............ 345/204 |
| 2008/0007752 A1 | | 1/2008 | Gandhi et al. |
| 2013/0249923 A1 | | 9/2013 | Lerner |

OTHER PUBLICATIONS

Cucchiara et al., "Neighbor Cache Prefetching for Multimedia Image and Video Processing", IEEE Transactions on Multimedia, vol. 6, No. (Aug. 2004), 18 pages.

International Search Report and Written Opinion for International Application No. PCT/2010/55056 mailed Dec. 29, 2010, 6 pages.

Non-Final Office Action in U.S. Appl. No. 13/354,819 mailed Jun. 13, 2012.

Response to Non-Final Office Action in U.S. Appl. No. 13/354,819 filed Sep. 13, 2012.

Final Office Action in U.S. Appl. No. 13/354,819 mailed Oct. 9, 2012.

Response to Final Office Action in U.S. Appl. No. 13/354,819 filed Jan. 9, 2013.

Notice of Allowance in U.S. Appl. No. 13/892,508 mailed Feb. 19, 2014.

Non-Final Office Action in U.S. Appl. No. 13/892,508 mailed Sep. 26, 2013.

Response to Non-Final Office Action in U.S. Appl. No. 13/892,508 filed Nov. 27, 2013.

Benedetti et al., "Image Convolution of FPGAs: The Implementation of a Mutli-FPGA FIFO Structure", Proceedings of the $24^{th}$ Euromicro Conference (Euromicro 98), (1998), pp. 123-130.

* cited by examiner

METHODS AND APPARATUS FOR IMAGE PROCESSING AT PIXEL RATE

CROSS-REFERENCE TO RELATED APPLICATION

This application is a continuation (and claims the benefit of priority under 35 U.S.C. §120) of U.S. patent application Ser. No. 13/354,819, filed Jan. 20, 2012, and entitled "METHODS AND APPARATUS FOR IMAGE PROCESSING AT PIXEL RATE" being issued on May 14, 2013 as U.S. Pat. No. 8,441,492, which is a continuation of Ser. No. 12/619,825, filed Nov. 17, 2009, and entitled "METHODS AND APPARATUS FOR IMAGE PROCESSING AT PIXEL RATE," now issued as U.S. Pat. No. 8,130,229. The disclosures of the prior applications are considered part of (and are incorporated herein by reference of this application.

FIELD OF THE INVENTION

This invention relates generally to digital signal processing and computer graphics, and more particularly, to image processing at pixel rate.

BACKGROUND OF THE INVENTION

In processing two-dimensional (2-D) images, it is known to apply a small matrix or kernel to successive pixel blocks to generate output pixels. For example, in 2-D convolution operations, an $n^x$ rn rnatrix ("convolution mask") is typically applied to an image following a raster pattern and, for each pixel in the image, the convolution mask is centered on that pixel and convolved with the corresponding $n^x$m pixels in the image to compute an output pixel value. The output pixels so generated then collectively form a new (processed) digital image. Depending on the convolution mask used, 2-D convolution operations can filter out noise, enhance object edges, or achieve other desired effects on a digital image. Similarly, in 2-D correlation operations, a matrix is applied to an image in raster mode and computed with each pixel and its neighboring pixels to generate a corresponding output pixel. These and other kernel-based 2-D processing operations can be implemented in software or hardware and applied to still images or frames in video sequences.

Figure 1:
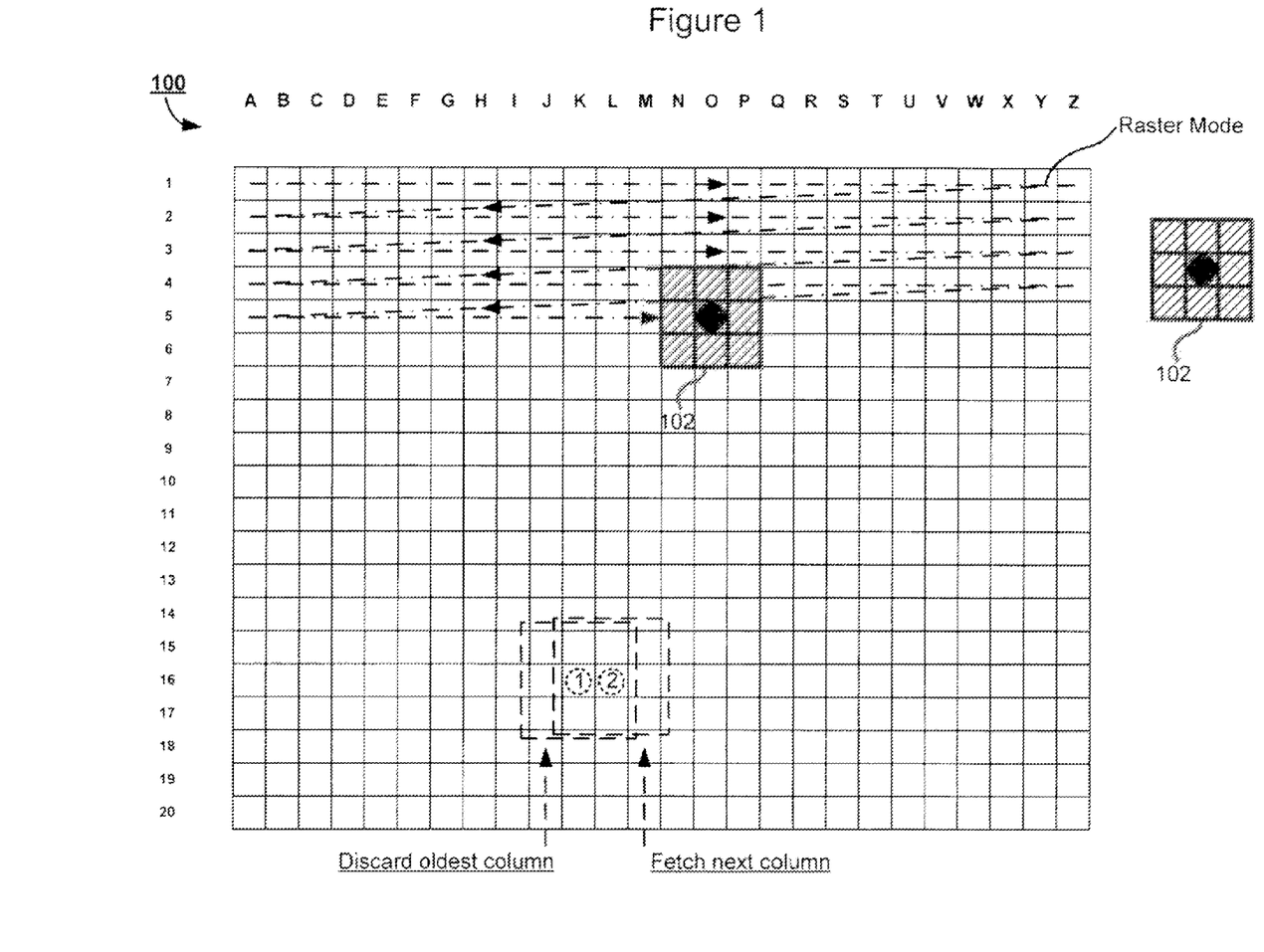
FIG. 1 shows an exemplary image with an array of pixels.

FIG. 1 shows an exemplary image 100 having a 26×20 array of pixels, each small square representing one pixel. A 3×3 kernel 102 may be applied to the image 100, starting from the top left corner (i.e., Pixel A1) and passing from edge to edge, line by line in raster mode. For each pixel in the image 100, the digital values of a corresponding pixel block—that pixel and its eight neighboring pixels—need to be retrieved from a memory device or an input buffer before those pixel data are computed with the values of the kernel matrix. The steps of retrieving the pixel data and computing the pixel data with the kernel are typically pipelined, driven by a clock at pixel rate. As the kernel is advanced to the next pixel, for example, from Pixel K16 (marked "1") to Pixel L16 (marked "2") in the image 100, only one new column of pixel data (i.e., those of Pixels M15-17) needs to be retrieved. That is, during each clock cycle in the pipelined process, only one new column of pixel data is retrieved from the memory or input buffer, and one output pixel value is usually generated at the same time. Thus, when those pixel blocks located completely within the boundaries of the image 100 ("internal pixel blocks") are processed, there can be a one-to-one relationship between the rate of retrieving pixel data columns and the outgoing pixel rate.

Figure 2:
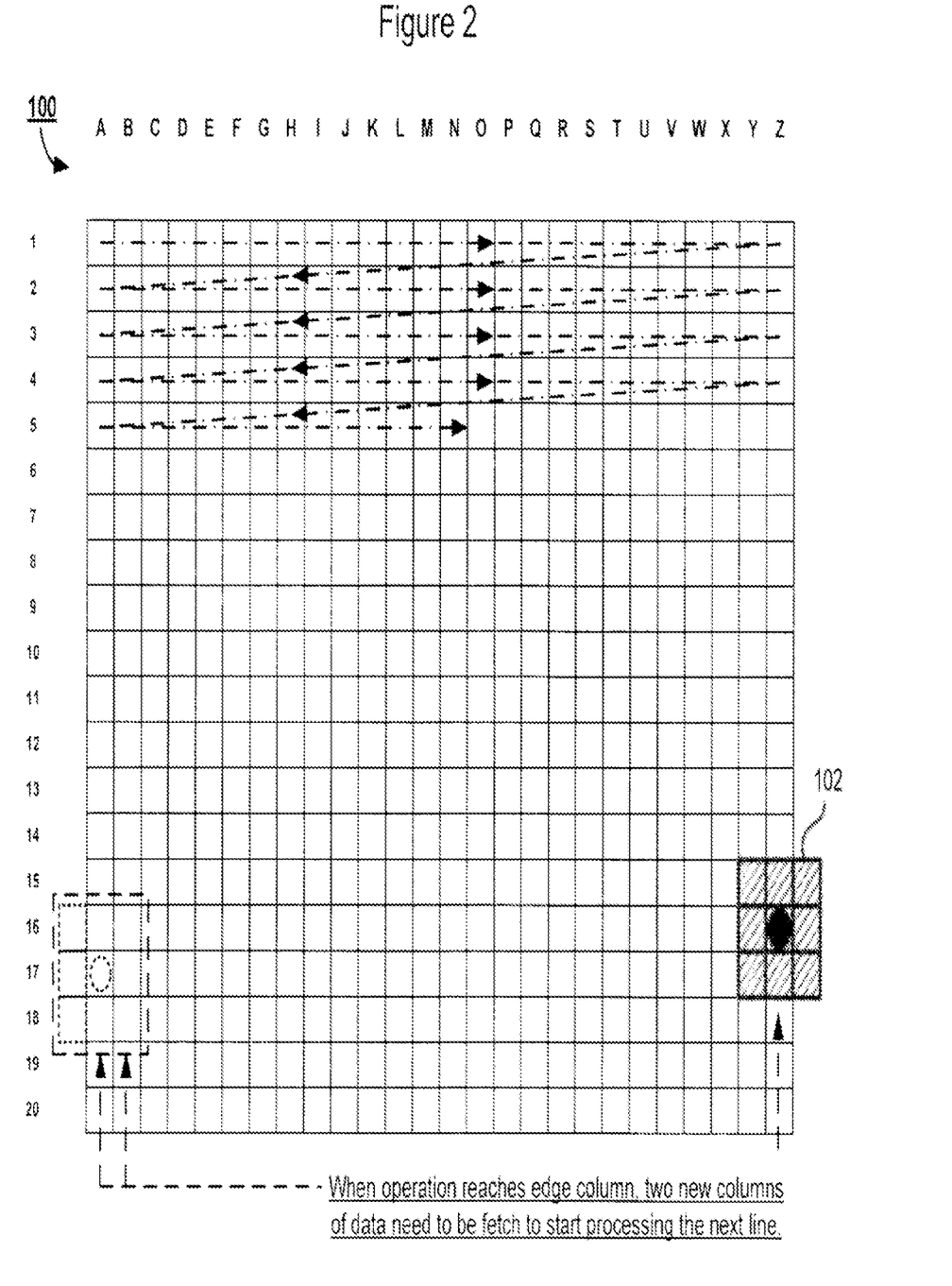
FIG. 2 illustrates a disruption of constant pixel rate encountered in conventional 2-D image processing approaches.

However, such a fetch-one-column-and-output-one-pixel timing pattern cannot be maintained when the kernel reaches an edge of the image and is about to start scanning and operating on a new line or frame. FIG. 2 illustrates this problem, again with the image 100 and the kernel 102. The pixel block covered by the kernel 102 in FIG. 2, which is centered on Pixel Z16, may be referred to as an "edge pixel block." As the kernel 102 moves from the last pixel on line 16 (Pixel Z16) to the first pixel on line 17 (Pixel A17), two new columns of pixel data (i.e., those of Pixels A16-18 and B16-18) need to be fetched before the output pixel value corresponding to Pixel A17 can be computed. A similar problem exists with kernels of other sizes and when the kernel transitions to a new frame in a video sequence, In order to maintain the outgoing pixel rate during the transition, conventional 2-D image processing approaches would require either extra clock cycles for the extra column(s) to be fetched or a memory bandwidth much larger than what is used for non-edge pixel blocks. Neither of these solutions is desirable for lack of efficiency,

SUMMARY OF THE INVENTION

Embodiments of the present invention provide for improved timing control in 2-D image processing to maintain a constant rate of memory fetches and pixel outputs even when the processing operations transition to a new line or frame of pixels.

In one aspect of the invention, a method for processing one or more images having a plurality of pixels includes processing successive pixel blocks in raster mode between a first edge and a second edge of an image. During each single clock unit when a next pixel block to be processed does not extend beyond said second edge, one new vector (i.e., a row or a column) of the next pixel block is fetched from a storage device. During each single clock unit when said next pixel block to be processed extends beyond said second edge, a new vector in said next pixel block that is located beyond said second edge is filled with predetermined pixel values while one new vector of a first pixel block on a next line or frame of pixels is fetched from said storage device. In said each single clock unit, one output pixel value is generated, thereby maintaining a constant rate of memory fetches and pixel outputs.

In another aspect of the invention, an apparatus for processing one or more images having a plurality of pixels includes: (i) means for processing successive pixel blocks in raster mode between a first edge and a second edge of an image; (ii) means for, during each single clock unit when a next pixel block to be processed does not extend beyond said second edge, fetching one new vector of the next pixel block from a storage device; (iii) means for, during each single clock unit when said next pixel block to be processed extends beyond said second edge, filling a new vector in said next pixel block that is located beyond said second edge with predetermined pixel values and simultaneously fetching, from said storage device, one new vector of a first pixel block on a next line or frame of pixels; and (iv) means for outputting, in said each single clock unit, one output pixel value, thereby maintaining a constant rate of memory fetches and pixel outputs.

In still another aspect, an apparatus for processing successive pixel blocks in raster mode between a first edge and a second edge of an image may comprise: an input data interface coupled with one or more storage devices to receive at least one input stream of pixel values of said image; an array of pixel processing cells, each cell including a coefficient storage unit that stores a coefficient value of a kernel to be applied to said image during a two-dimensional image processing, a pixel storage unit that stores a pixel value of said image, said pixel storage unit being coupled either to another pixel storage unit of an adjacent cell or to said input data interface, thereby allowing said pixel value to be initially received via said input data interface and subsequently propagated from one vector to an adjacent vector across said array, a multiplexer unit, if said each cell is not in a center vector of said array, having inputs coupled to said pixel storage unit, a center-vector pixel storage unit on the same line of said array, and any pixel storage unit located between said center vector and said each cell, and one or more intra-cell operation units; inter-cell operation units that process outputs from said array of pixel processing cells to generate an output pixel value; and a timing control module that coordinates operations of said input data interface, said army of pixel processing cells, and said inter-cell operation units. During each single clock unit when a next pixel block to be processed does not extend beyond said second edge, said timing control module causes one new vector of said next pixel block to be fetched from said one or more storage devices. During each single clock unit when said next pixel block to be processed extends beyond said second edge, said timing control module causes a new vector in said next pixel block that is located beyond said second edge to be filled with predetermined pixel values while causing one new vector of a first pixel block on a next line or frame of pixels to be fetched from said one or more storage devices, thereby maintaining a constant rate of memory fetches and pixel outputs.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE INVENTION

Embodiments of the present invention improve image processing and can maintain a one-to-one relationship between incoming pixel rate and outgoing pixel rate without additional clock cycles or memory bandwidth even when the processing operations transition to a new line or a new frame of pixels. An improved timing control according to the present invention takes advantage of idle memory bandwidth by pre-fetching a new column of pixel data in a first pixel block of a next line or frame while a new column of an edge pixel block on a current line is duplicated or zeroed out. As the edge pixel block(s) on the current line are processed, the data in the first pixel block of the next line or frame become ready for computation without extra clock cycles or extra memory bandwidth. More details, features, and advantages of the present invention can be appreciated with reference to the accompanying drawings and the detailed explanation below.

Figure 3:
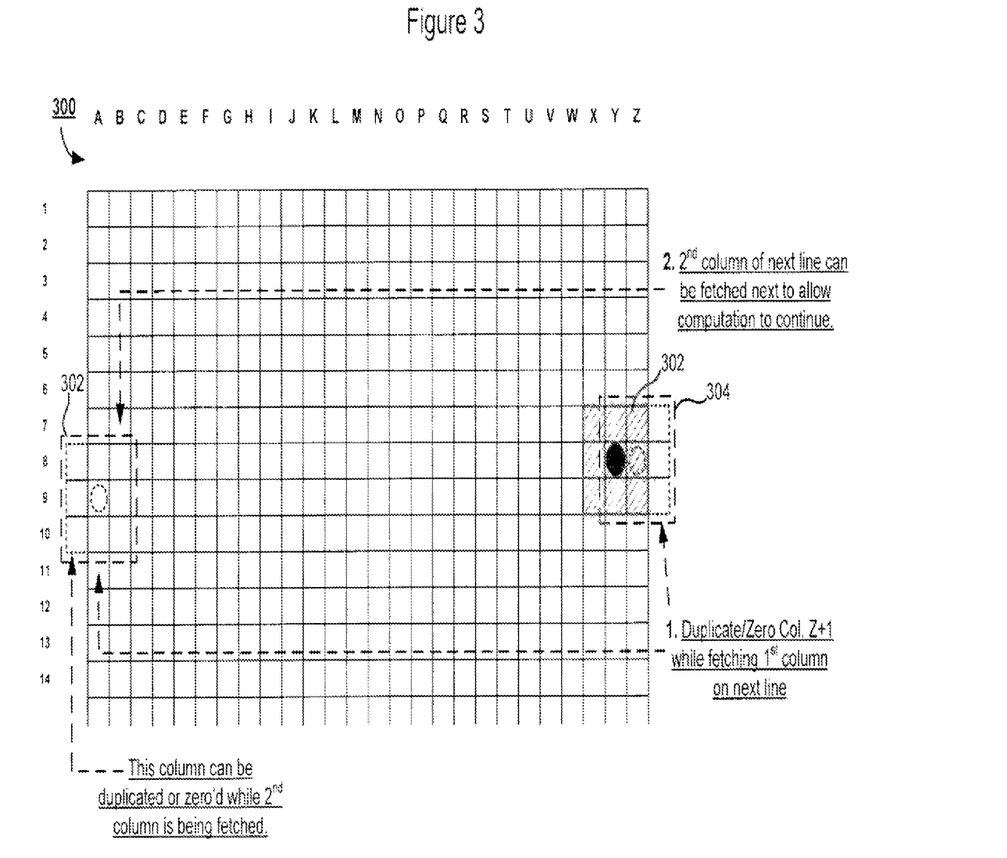
FIG. 3 illustrates an exemplary method of 2-D image processing with a 3×3 kernel in accordance with an embodiment of the present invention.

Referring to FIG. 3, there is illustrated an exemplary method of 2-D image processing with a 3×3 kernel 302 in accordance with an embodiment of the present invention. FIG. 3 shows part of a digital image 300 over which the kernel 302 is scanned in raster mode.

As used herein, the tem1 "raster mode" refers to a line-by-line or line-after-line pattern of scanning a kernel over an image during 2-D image processing operations such as convolution or correlation. Typically, the kernel is advanced one pixel at a time and from one edge of the image to an opposite edge, thereby covering successive pixel blocks where each new block includes only one new column of pixels not in its adjacent block. However, the raster mode does not necessarily require the scanning to cover every single line of the image or consistently moving from one line to its next adjacent line. For example, the raster pattern may cover odd lines of an image and then cover even lines. Nor does the raster mode necessarily require a specific scanning direction on each line of the image. Furthermore, those skilled in the art will appreciate that the term "column" and "line" have relative significance when one is used in the context of the other. Therefore, a 2-D image processing implementation where a kernel is scanned column-wise and new lines of pixel data are pre-fetched also falls within the scope of the present invention herein disclosed.

In FIG. 3, the kernel 302 is scanned over the image 300 one line after another in raster mode. As the kernel 302 is advanced on Line 8 to the right edge of the image 300, the last complete pixel block covered by the kernel 302 is centered around Pixel Y8, and the last column of new data fetched on that line correspond to Pixels Z 7-9. The values of Pixels Z7-9 may be fetched from a storage device (e.g., a memory, input buffer, or first-in-first-out (FIFO) device) during one clock unit. As used herein, the term "clock unit" refers to a unit of time, such as one full clock cycle or one half of a clock cycle, that provides timing reference to or synchronizes logic gates or arithmetic devices during pipelined image processing operations.

As the kernel is advanced to the last pixel on Line 8 (i.e., Pixel Z8), the next pixel block to be processed, block 304, extends beyond the right edge of the image 300. A new column of pixel data (on Col. Z+I and in the pixel block 304) that would otherwise need to be fetched from the storage device will instead receive values duplicated from pixels in a corresponding portion of the right edge of the image 300. That is, in one embodiment the new column (Col. Z+I) will be a copy of the values of the last column (Pixels Z7-9) which have already been fetched in the previous clock unit. in another embodiment, the image processor may be configured to fill the new column with zeros or other numeric values, That is, in general, the "new" column (Col. Z+1) is to be filled with pixel values that do not need to be fetched from the storage device. While Col. Z+1 is being filled with predetermined values (e.g., either duplicated values or zeros), memory bandwidth is available for fresh data to be fetched from the storage device. Accordingly, embodiments of the present invention take advantage of this idle memory bandwidth and may cause the first column of pixel data on the next line or frame of the image to be pre-fetched. In this particular example shown in FIG. 3, during the single clock unit while Col. Z+1 on Line 8 is being filled with pixel values duplicated from Col. Z or simply filled with zeros, the pixel values of the first column on Line 9, Pixels A8-10, may be pre-fetched from the storage device.

Then, in the next dock unit, the second column of pixel data on Line 9 may be pre-fetched from the storage device. The portion of the first pixel block on Line 9 that extends beyond the left edge of the image 300 may be filled with either pixel values of the first column (Pixels A8-10, already fetched in the previous clock unit) or zeros. As a result of the timing arrangement heretofore described, the image processor has been able to fetch one and only one new column of pixel data during each single clock unit, even when the 2-D image processing operations transition from Line 8 to Line 9 of the image 300. Such memory fetches performed at the constant input pixel rate, pipelined with the other computation steps, can therefore ensure a constant output rate of one output pixel value per clock unit.

Figure 4:
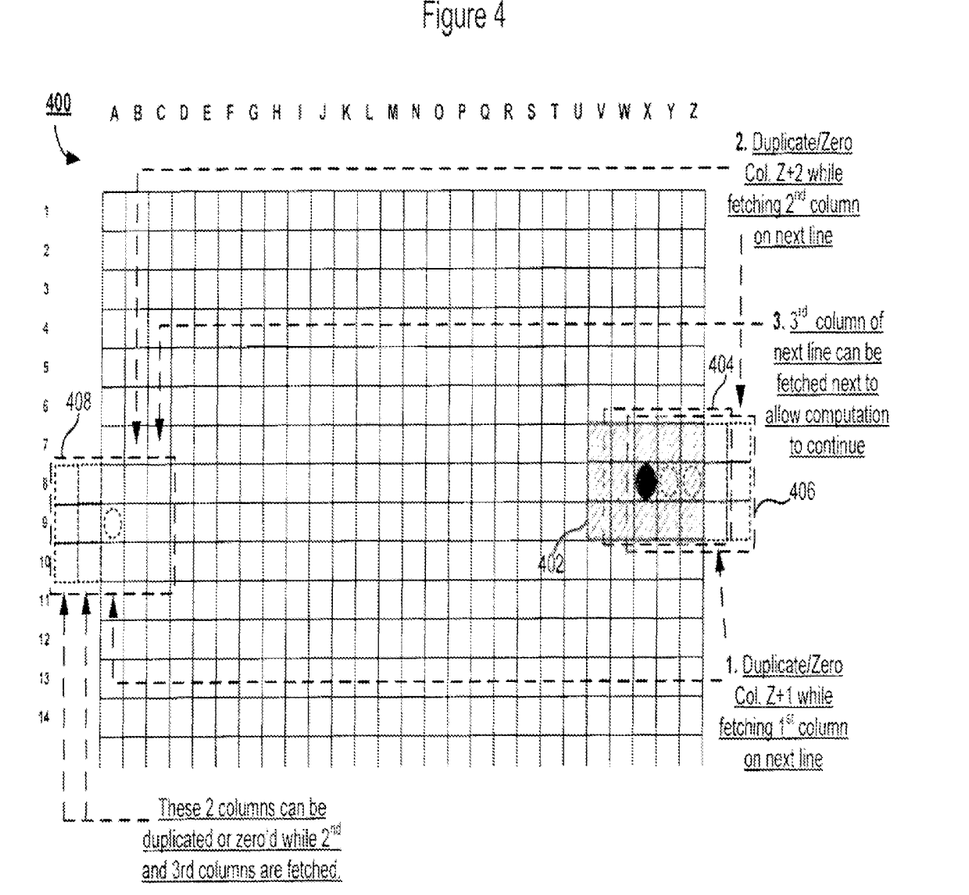
FIG. 4 illustrates an exemplary method of 2-D image processing with a 5×3 kernel in accordance with an embodiment of the present invention.

FIG. 4 illustrates an exemplary method of 2-D image processing with a 5×3 kernel 402 in accordance with an embodiment of the present invention. FIG. 4 shows part of a digital image 400 over which the kernel 402 is scanned in raster mode.

When the center of the kernel 402 advances to Pixel X8, in clock unit T, the next pixel block to be processed, block 404, will be centered on Pixel Y8 and extend beyond the right edge of the image 400. During the single clock unit T while Col. Z+1 is being filled with zeros or values duplicated from Pixels Z7-9, the first column on the next line (Line 9), Pixels A8-10, may be pre-fetched from a storage device.

In the next clock unit T+1, the next pixel block to be processed, 406, will be centered on Pixel Z8 and extend even further beyond the right edge of the image 400. During the single clock unit T+I while Col. Z+2 is being filled with zeros or values duplicated from Pixels Z7-9, the second column on Line 9 may be pre-fetched from the storage device.

In the next clock unit T+2, the next pixel block to be processed, 408, will be centered on Pixel A9. During the single clock unit T+2, the third column on Line 9 may be fetched from the storage device. Columns A-1 and A 2 on Line 9 may be filled with predetermined pixel values such as zeros or values of Pixels A8-10.

At the conclusion of the clock unit T+2, all elements of the first pixel block (408) on Line 9 are ready for computation with the kernel 402.

Embodiments of the present invention may be implemented in software, firmware, and/or hardware. Most preferably, embodiments of the present invention are implemented in a 2-D convolution or correlation compute engine as part of a digital image processing system or graphics acceleration apparatus.

Figure 5:
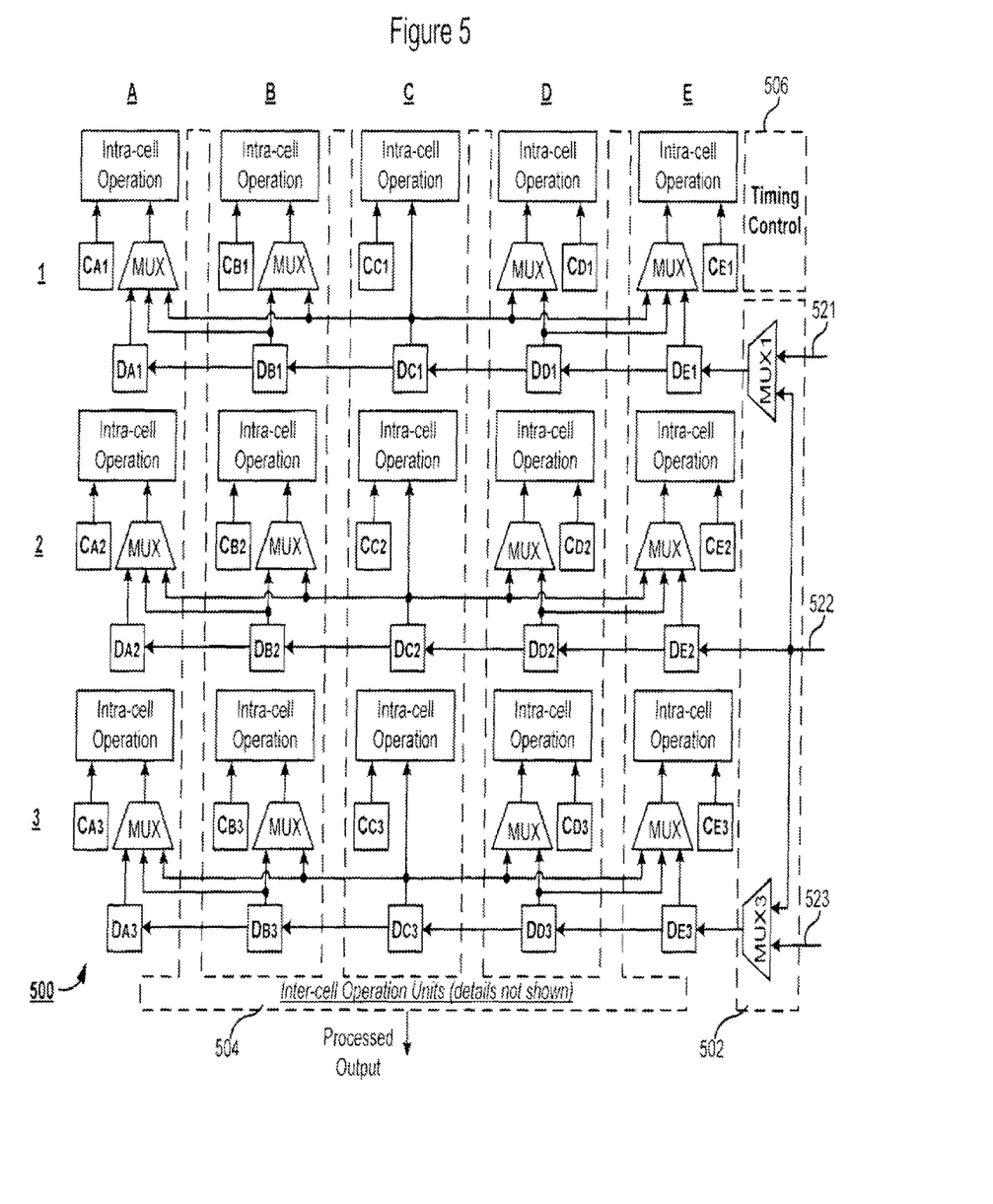
FIG. 5 shows an exemplary 2-D image processing engine in accordance with an embodiment of the present invention

FIG. 5 shows an exemplary 2-D image processing engine 500 in accordance with an embodiment of the present invention.

The 2-D image processing engine 500 includes an array of pixel processing cells (in this embodiment, a 5×3 array), an input data interface 502, inter-cell operation units 504, and a timing control module 506.

Each of the pixel processing cells in the array includes a coefficient storage unit, such as a data register (e.g., $C_{A1}$ and $C_{B2}$), that stores a coefficient value of a kernel to be applied to a pixel block during a 2-D image processing (e.g., convolution or correlation operations). Each pixel processing ceil also includes a corresponding pixel storage unit, such as a data register (e.g., $D_{A1}$ and $D_{B2}$ that stores a pixel value of the pixel block. Each pixel storage unit is coupled with pixel storage units of adjacent pixel processing cells on the same line. If the pixel processing cell is in the edge column on the input side (here, Col. E), the pixel storage unit is also coupled to the data input interface 502 to receive fresh pixel data. As a result, a new column of pixel values may be obtained via the data input interface 502 and temporarily stored in the pixel storage units in the input side edge column, and the previously stored pixel values in each column of pixel storage units can be "pushed" or duplicated to the next column on the left. This arrangement forms a data path whereby a column of pixel values can be propagated from the data input interface 502 to the Jett, hopping one column per clock unit. By the end of each clock unit, the pixel values previously stored in the pixel storage units of the leftmost column, here Col. A, are overwritten and therefore discarded.

Each pixel processing cell, if it is not in the center column, here Col. C, also includes a multiplexer unit ("MUX"), The multiplexer unit has one input coupled to the pixel storage unit in the same cell. In addition, the multiplexer unit has inputs coupled to a center-column pixel storage unit on the same line as well as any pixel storage unit that is located between the center column and the current cell. As a result, data paths are created for each column not located on the left or right edge of the array ("non-edge column") to duplicate its content outwardly to other column(s) to the extent the multiplexer units introduce additional delays in the non-center-column cells, delay elements may be included in the center-column cells to balance out the delays among the cells, as can be appreciated by those skilled in the art.

Each pixel processing cell further includes one or more intra-cell operation units (e.g., arithmetic or logic devices such as a multiplier) that receive an input from the corresponding coefficient storage unit in the same cell. The intra-cell operation unit(s) also receive an input from the corresponding pixel storage unit directly (here the center column, Col. C) or from the output of the multiplexer unit (as in non-center-columns). Results of the intra-cell operations may be further processed with inter-cell operation units 504 (details not shown) to generate a processed output such as an output pixel value.

The input data interface 502 of the 2-D image processing engine 500 couples the array with one or more storage devices (not shown), such as an input buffer and/or an input first-in-first-out (IFIFO) device, that provide fresh pixel values for the three rows of pixel processing cells. More specifically, the fresh pixel values arc inputted to the pixel storage units in the edge column on the input side (here Col. E) via input lines 521, 522, and 523 before being propagated to the rest of the columns. Two multiplexers, MUX1 and MUX3, are provided to allow the center row (here Row 2) pixel values to be duplicated to the non-center-rows, for example, when processing a top or bottom line of an image. Typically, the input image pixel data are all temporarily stored in an input buffer, and therefore all three input lines 521, 522, and 523 are coupled to the input buffer. According to one embodiment of the present invention, one of the input lines (e.g., line 523 which feeds the bottom row input) may be coupled directly to an IFIFO receiving a live feed of one row' of the pixel values, therefore saving one third of the buffer space and memory bandwidth that would othe1wisc be required.

The timing control module 506 coordinates a pipelined process of computing successive pixel blocks of an image against the kernel whose coefficient values are stored in the coefficient storage units. In each clock unit, the timing control module 506 causes one column of fresh pixel values to be fetched into pixel storage units $D_{E1}$, $D_{E2}$, and $D_{E3}$ (here in Col. E) via the data input interface 502. After pixel values of an edge column of the image on a current line are fetched into the edge column pixel storage units (here Col. E), in the next clock unit (T+1), the timing control module 506 may cause a first column on a next line of the image (or a new line of a next frame) to be pre-fetched into an edge column (here Col. E) via the data input interface 502. The pixel values of this edge column are now duplicated Io the pixel storage units in the left adjacent column (here Col. D). Then, in the next clock unit (T+1), such pixel values of the edge column can be selected by the multiplexer units in the edge column (here Col. E) for intra-cell operations. During clock unit (T+1), the timing control module 506 may cause a second column on the next line of the image to be pre-fetched into the edge column (here Col. E) via the data input interface 502 while pushing pixel values of the first column on the next line into the left adjacent column (here Col. D) and pushing the pixel values of the edge column on the current line into the next left adjacent column (here Col. C). In the next clock unit (T+2), the pixel values of the edge column can again be selected by the multiplexer units in Col. D and Col. E for intra-cell operations. During clock unit (T+2), the timing control module 506 may cause a third column on the next line of the image to be pre-fetched into the edge column (here Col. E) while pushing pixel values of the first and second columns on the next line into the two left adjacent columns (here Col. C and Col. D respectively). The next clock unit (T+3) will see the 2-D image processing engine 500 ready to proceed with computation on the first pixel on the next line of the image.

Figure 6:
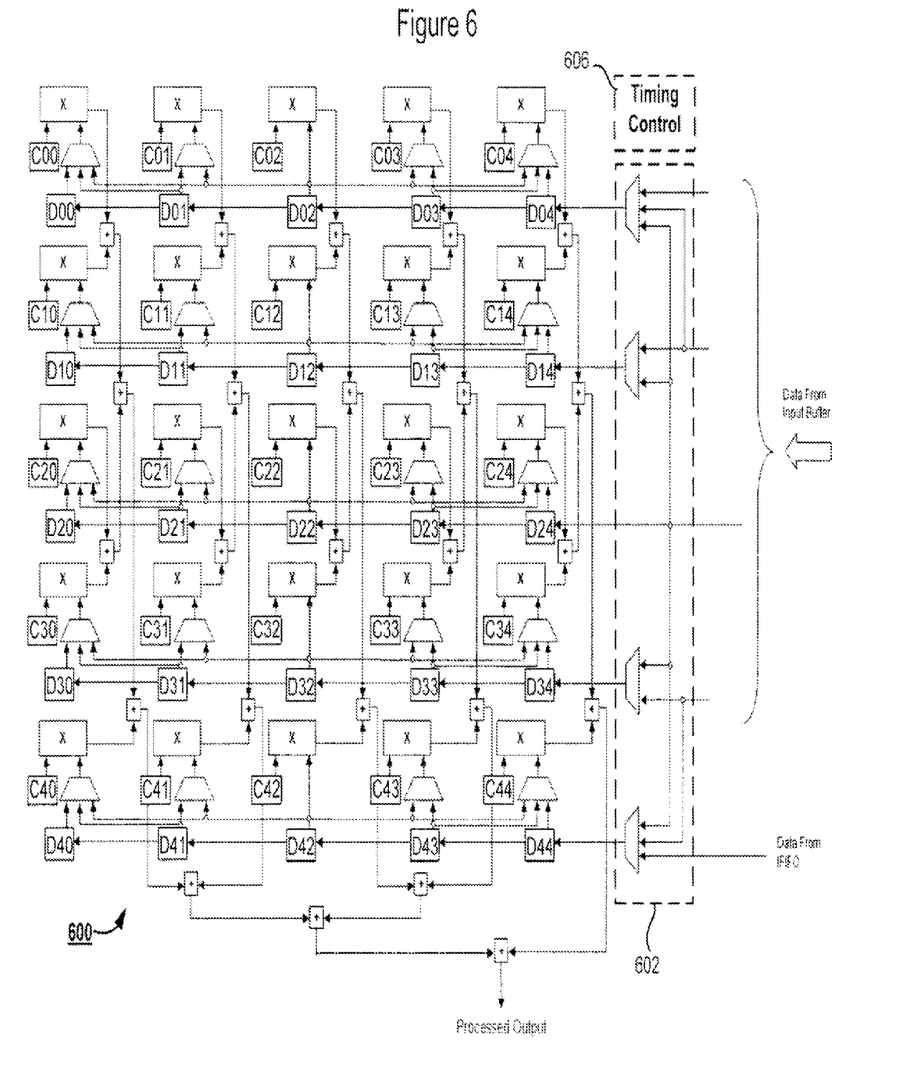
FIG. 6 shows an exemplary 2-D convolution engine for image processing in accordance with an embodiment of the present invention.

The architecture of the 2-D image processing engine 500 shown in FIG. 5 is scalable in both dimensions to accommodate arbitrary kernel sizes. FIG. 6 shows an exemplary 2-D convolution engine 600 with a 5×5 array of pixel processing cells for image processing in accordance with an embodiment of the present invention. For 2-D convolution operations, the intra-cell operation unit in each pixel processing cell is a multiplier, and the inter-cell operation units include adders cascaded to sum up the output products of all the multipliers to finally generate a processed output With more rows than the 2-D image processing engine 500, the 2-D convolution engine 600 includes additional multiplexers in its input data interface 602 to route center-row pixel values to the non-center rows. A timing control module 606 coordinates the operations of the various elements in a pipelined process wherein the input pixel rate and output pixel rate maintain a one-to-one relationship in accordance with the above-described memory fetch and data routing techniques.

From the examples illustrated in FIGS. 3-6, it can be appreciated that embodiments of the present invention can be implemented in 2-D image process mg operations applying any $n^x m$ kernel matrix to successive pixel blocks where n and m are typically both odd integers. According to some embodiments, the methods and apparatus disclosed herein may be adapted to accommodate a $n^x m$ kernel matrix where n and/or m are even integers. In addition, such 2-D image processing is not limited to convolution operations and can be applied to 2-D correlation or other operations.

Figure 7:
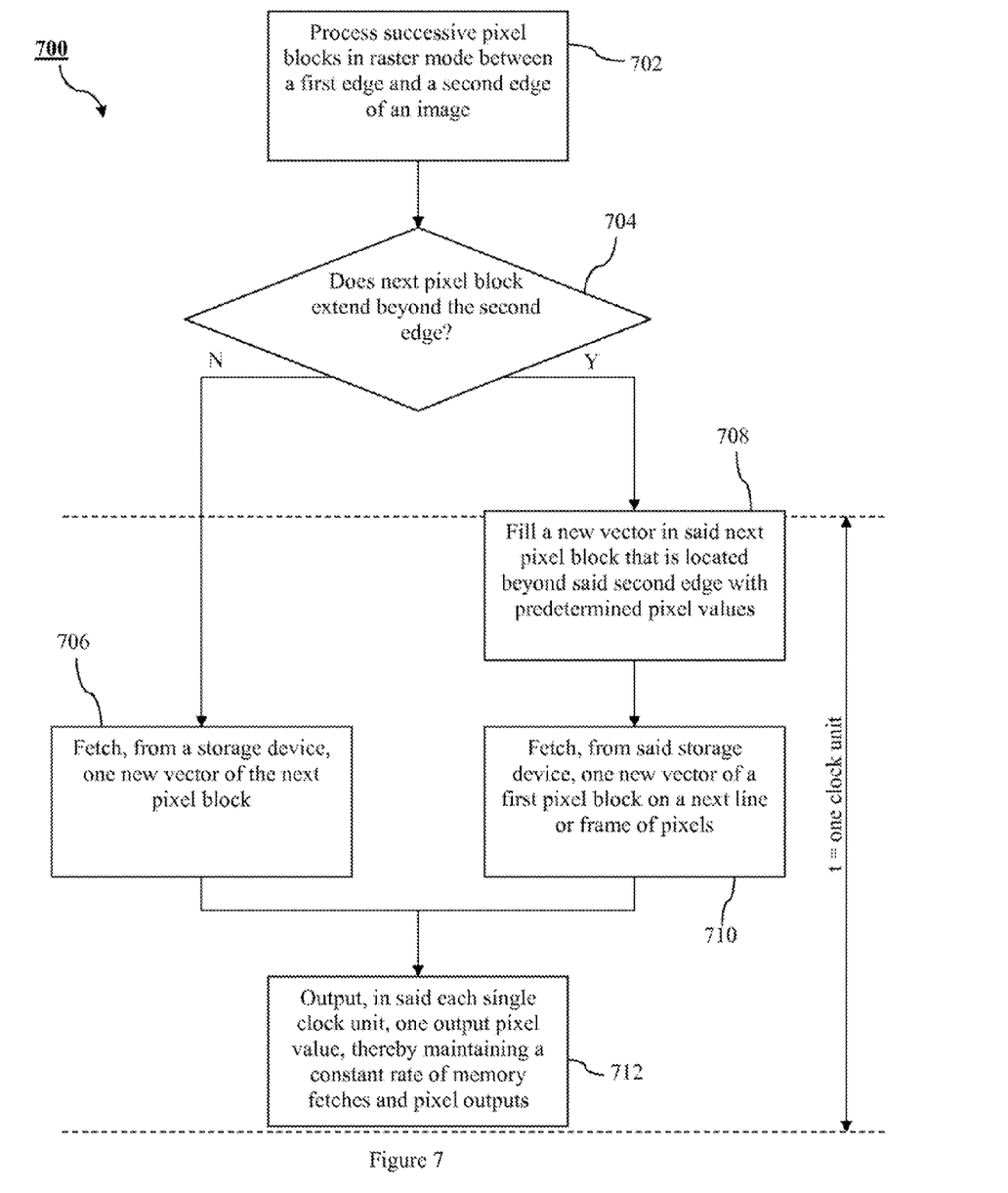
FIG. 7 illustrates one embodiment of a method for processing an image at pixel rate in accordance with an embodiment of the invention.

FIG. 7 illustrates one embodiment of a method 700 for processing an image at pixel rate in accordance with an embodiment of the invention. Successive pixel blocks are processed in raster mode between a first edge and a second edge of an image (step 702). If a next pixel block to be processed does not extend beyond the second edge (step 704), one new vector of the next pixel block is fetched from a storage device (step 706). If, on the other hand, the next pixel block to be processed extends beyond the second edge (step 704), a new vector is filled in the next pixel block (that is located beyond said second edge) with predetermined pixel values (step 708), and one new vector of a first pixel block on a next line or frame of pixels is fetched from the storage device (step 710). One output pixel value is output, in each single clock unit, thereby maintaining a constant rate of memory fetches and pixel outputs (step 712).

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing within the scope of the invention as intended to be encompassed by the following claims and their legal equivalents.

What is claimed is:

1. A method for processing an image having a first edge and a second edge, comprising:
   filling a new vector in a next pixel block, which is located beyond the second edge, with predetermined pixel values, wherein the filling is performed in a first clock unit and the filling is performed substantially concurrent with fetching an additional vector of a first pixel block from a storage element; and
   outputting an output pixel value during each of a plurality of clock units such that a constant rate of pixel outputs is substantially maintained during the filling.

2. The method of claim 1, further comprising:
   transitioning to a new frame in a video sequence using a kernel.

3. The method of claim 1, wherein the processing includes processing successive pixel blocks in a raster mode between the first edge and the second edge of the image.

4. The method of claim 1, wherein the fetching is performed as a one-to-one relationship between incoming pixel rates and outgoing pixel rates.

5. The method of claim 4, further comprising:
   transitioning to a new frame of pixels for subsequent processing, wherein the one-to-one relationship is substantially maintained during the subsequent processing without implicating additional memory bandwidth.

6. The method of claim 1, further comprising:
   prefetching new pixel data in a particular pixel block as an edge pixel block on a current line is duplicated or zeroed out.

7. The method of claim 1, wherein a kernel is used for scanning the image in a raster mode.

8. The method of claim 7, wherein the scanning is associated with 2-D image processing operations.

9. The method of claim 8, wherein the 2-D image processing operations comprise a convolution operation.

10. The method of claim 8, wherein the 2-D image processing operations comprise a correlation operation.

11. The method of claim 1, wherein the storage element is a selected one of a group of storage elements, the group consisting of:
   a) a memory;
   b) an input buffer; and
   c) a first in first out (FIFO) device.

12. The method of claim 1, wherein the first clock unit is a timing reference that synchronizes logic gates during pipeline image processing operations.

13. A method, comprising:
   advancing a kernel over a last pixel of an image being processed;
   evaluating a next pixel block to be processed, wherein the next pixel block extends beyond an edge of the image;
   processing a new column of pixel data using values duplicated from pixels in a corresponding portion of the edge of the image; and
   prefetching pixel values of a first column, during a single clock unit in which the new column is filled with pixel values duplicated from another column.

14. The method of claim 13, wherein the new column reflects a copy of values of a particular column that has already been fetched in a previous clock unit.

15. The method of claim 13, wherein an image processor is configured to build a subsequent column of pixel data with zeros or other numeric values.

16. The method of claim 13, wherein during a next clock unit, a second column of pixel data is prefetched from a storage device.

17. The method of claim 13, wherein a plurality of memory fetches are performed at a constant input pixel rate.

18. The method of claim 13, wherein a plurality of memory fetches are pipelined with additional computations such that a constant output rate of one output pixel value per-clock unit is maintained.

19. An image processing engine for processing an image, comprising:
   an array of pixel processing cells;
   an input data interface;
   an inter-cell operation unit; and
   a timing control module, wherein
   the image processing engine is configured for maintaining a constant rate of input pixels and output pixel values, as a block of pixels for processing extends beyond an edge of the image.

20. The image processing engine of claim 19, wherein each of the pixel processing cells includes a coefficient storage unit that stores a coefficient value of a kernel to be applied to a pixel block during 2-D image processing.

21. The image processing engine of claim 19, wherein each pixel processing cell includes a corresponding pixel storage unit that stores pixel values of a particular pixel block.

22. The image processing engine of claim 19, wherein each pixel storage unit is coupled with a pixel storage unit of adjacent pixel processing cells on a same line.

23. The image processing engine of claim 19, wherein the input data interface obtains a new column of pixel values that are stored in pixel storage units in an input side edge column, and previously stored pixel values in each column of the pixel storage units are duplicated to a subsequent next column.

24. The image processing engine of claim 19, wherein at an end of each clock unit, pixel values previously stored in pixel storage units of a leftmost column are overwritten.

25. The image processing engine of claim 19, wherein each of the pixel processing cells includes a multiplexer that has one input coupled to a pixel storage unit.

26. The image processing engine of claim 19, wherein the input data interface couples the array to an input buffer that provides fresh pixel values for three rows of pixel processing cells.

27. The image processing engine of claim 19, wherein two multiplexers are provided to allow center row pixel values to be duplicated to non-center rows when processing a top or bottom line of an image.

28. The image processing engine of claim 19, wherein at least one input line feeds a bottom row input and is coupled directly to an input first-in-first-out (IFIFO) that receives a live feed of one row of pixel values.

29. The image processing engine of claim 19, wherein the timing control module coordinates a process of computing successive pixel blocks of the image against a kernel whose coefficient values are stored in a coefficient storage unit.

* * * * *